United States Patent [19]

van Beers

[11] Patent Number: 4,475,718

[45] Date of Patent: Oct. 9, 1984

[54] SELF-TAILING WINCH

[75] Inventor: Willem P. van Beers, Brielle, Netherlands

[73] Assignee: Meissner International B.V., Brielle, Netherlands

[21] Appl. No.: 498,262

[22] Filed: May 26, 1983

[30] Foreign Application Priority Data

May 28, 1982 [NL] Netherlands ............... 8202198

[51] Int. Cl.³ .................. B66D 1/30; B66D 1/22
[52] U.S. Cl. ............................ 254/371; 254/344
[58] Field of Search .......... 254/221, 243, 344, 371, 254/345, 372; 24/263 D, 263 SW, 263 B, 249 DP; 226/193; 242/117; 114/218

[56] References Cited

U.S. PATENT DOCUMENTS

| 303,106 | 8/1884 | Baxter | 226/193 |
|---|---|---|---|
| 3,730,483 | 5/1973 | Newell | 254/371 |
| 3,797,806 | 3/1974 | Demmert | 254/372 X |
| 3,985,340 | 10/1976 | Guangorena | 254/371 |
| 4,143,855 | 3/1979 | Burton et al. | 254/344 |
| 4,230,306 | 10/1980 | Porter | 254/371 |

FOREIGN PATENT DOCUMENTS

| 1525025 | 6/1969 | Fed. Rep. of Germany | 254/371 |
|---|---|---|---|
| 2272020 | 12/1975 | France | 254/371 |
| 2297182 | 8/1976 | France | 254/371 |
| 2310304 | 12/1976 | France | 254/333 |
| 2371878 | 7/1978 | France | 254/371 |
| 2441576 | 6/1980 | France | 254/371 |
| 426 | of 1852 | United Kingdom | 226/193 |
| 1550175 | 8/1979 | United Kingdom | 254/344 |
| 1586132 | 3/1981 | United Kingdom | 254/344 |

*Primary Examiner*—Stuart S. Levy
*Assistant Examiner*—Joseph J. Hail, III
*Attorney, Agent, or Firm*—Scully, Scott, Murphy & Presser

[57] ABSTRACT

A self-tailing winch comprises a substantially cylindrical housing arranged for rotation about a central shaft. The housing is provided at the top with a flange thinning towards the circumference and an annular plate disposed on the top of the housing and thinning towards the circumference. The plate has a diameter substantially equal to that the flange, in such a way that between the flange and the annular plate there is produced a V-shaped slot. A stripper arm is mounted above the annular plate, which stripper arm has a portion extending downwardly beyond the circumference of the annular plate. According to the invention, tooth-like raised portions are provided on the facing surfaces of the annular plate and the flange, so that opposite each tooth on the flange surface there is a tooth on the surface of the plate. One tooth of each pair of opposed teeth is convex and one tooth is concave.

4 Claims, 9 Drawing Figures

SELF-TAILING WINCH

The invention relates to a self-tailing winch, comprising a substantially cylindrical housing arranged for rotation about a central shaft, said housing being provided at the top with a flange thinning towards the circumference, and an annular plate disposed on the top of the housing and thinning towards the circumference, said plate having a diameter substantially equal to the diameter of the flange in such a way that between flange and annular plate there is produced a V-shaped slot, and a stripper arm mounted above the annular plate, said stripper arm having a portion extending downwardly beyond the circumference of the annular plate.

The known, commercially available self-tailing winch comprises a cylindrical housing on which, in operation, a sheet or line has to be wound or from which a line has to be let out. To that end, the winch comprises a line-engaging portion formed by a pair of flanges or plates at the top end of the housing. Between the flanges or plates there is present a slot the "bottom" of which has virtually the same diameter as that of the housing on which the line is wound. In operation, the line is clamped between the jaws formed by the flanges of plates and, via the stripper arm, is guided from between the jaws around the housing. It is necessary for the line to be held firmly between the jaws to prevent slackness in the line wound about the housing during the letting out of the winding up thereof. The clamping retention of the line during letting out and winding up should be effected in such a way that the line is subjected to wear and tear to the least extent possible. With known winches it has been tried in different manners to meet the above requirements. For instance, a winch is known wherein the flange and annular plate thin towards the circumference to provide a V-shaped slot therebetween with smooth surfaces of flange and plate defining said slot. With another type of winch, only the flange thins towards the circumference and the surface of the annular plate, at the side of the flange, is planar and oriented perpendicularly to the axis of the winch, the plate being pressed by a spring mechanism in the direction of the flange. This winch is described in U.S. Pat. No. 3,985,340. In another type of winch, the facing surfaces of plate and flange are oriented perpendicularly to the winch axis, while on the surfaces there are provided teeth having the form of ribs or raised portions extending from the "bottom" of the slot towards the circumference of the flange or plate and arranged in such a way that a tooth on the surface of the plate is always present between two teeth on the surface of the flange. Although in all these known winches the problems of winding and letting out free from slackness and the occurrence of wear and tear of the line have been suppressed to some degree, winch users are still in need of a further improved winch in particular one causing still less wear and tear of the line, and ensuring that the line is properly held.

It is an object of the invention to provide a self-tailing winch meeting the above requirements. This object is achieved with a winch wherein on the facing surfaces of the annular plate and the flange, said surfaces defining the V-shaped slot, tooth-like raised portions are provided, so that opposite each tooth on the flange surface, there is disposed a tooth on the surface of the plate, one tooth of each pair of opposed teeth being convex and one tooth being concave.

In the winch according to the invention, the surfaces defining the V-shaped slot between the plate and the flange are fitted with teeth in such a way that always a pair of teeth, one of which is concave and one convex, is opposite one another. In such a construction, a comparatively great pressure is exerted by the convex tooth on the line to be held in the slot, which pressure, however, is compensated by the concave tooth without their grip on the line being lost. In the construction according to the invention, the winch can be used for a wide variety of line thicknesses. The same applies to the known winch with spring mechanism, but in that construction a substantial pressure is exerted on the line continuously to ensure a firm grip thereon, thus causing more wear and tear.

In a preferred embodiment of the winch according to the invention, the teeth on the surface of the flange are alternately convex and concave. Consequently, the teeth on the plate, too, are alternately concave and convex. This ensures a very good pressure distribution on the line so that still less wear and tear occurs than in case all convex teeth are present on one face and all concave teeth on the other face. With the self-tailing winch according to the invention, the teeth on the surfaces of the flange and the annular plate extend preferably according to a curved line from a point at the inside of the V-shaped slot to a point at the circumference of the respective flange or plate not lying in the plane through the axis of the housing and the point first mentioned. In such a construction, wherein the teeth, so to say, spiral outwardly, the grip on the line is optimal.

In a further embodiment of the winch according to the invention, the portion of each convex tooth that is highest relative to the surface of the flange or plate carrying the tooth lies adjacent the inside of the V-shaped slot, while the portion of each concave tooth that is highest relative to the surface of the flange or plate lies adjacent the circumference of the respective flange or plate, the height of the highest portion of a convex tooth being larger than the height of the highest portion of the opposite concave tooth. This has the advantage that the V-shaped slot between the teeth narrows inwardly more quickly than the V-shaped slot between the flange and the annular plate itself. This helps in reducing the possibility of wear and tear on the line.

One embodiment of apparatus according to the invention will now be described, by way of example, with reference to the accompanying drawings, in which.

Figure 1:
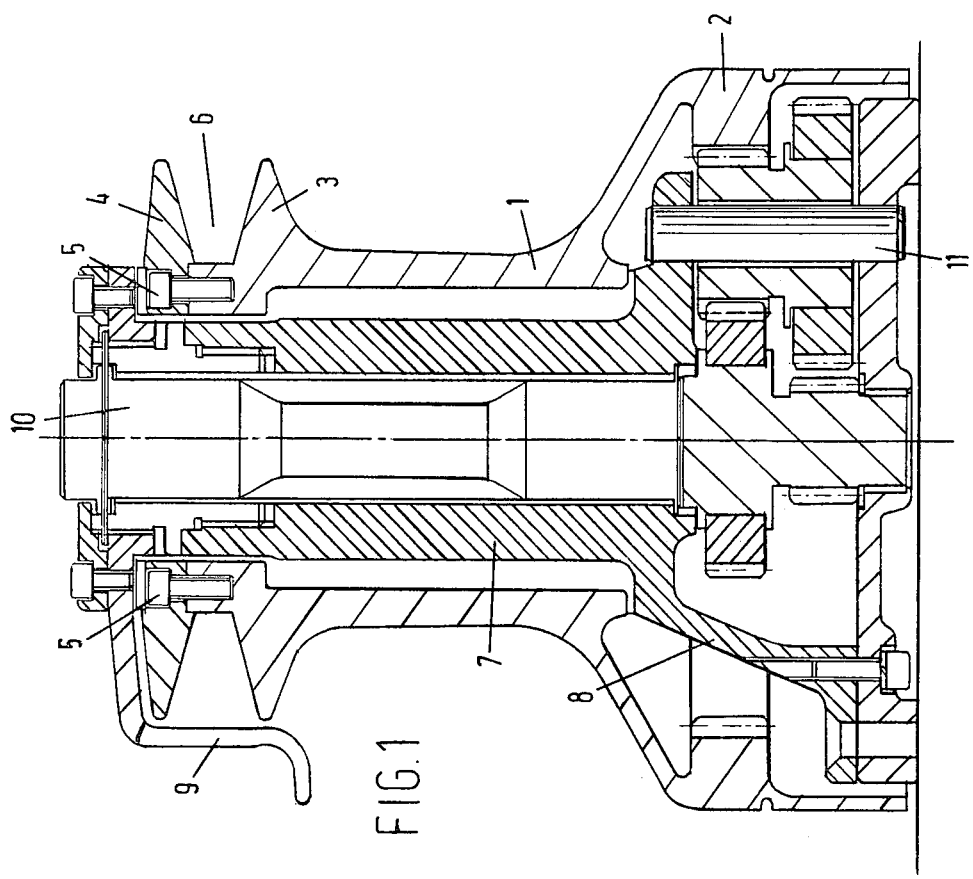
FIG. 1 is a cross-sectional view of an embodiment of the apparatus according to the invention.

FIG. 1 is a cross-sectional view of an embodiment of the apparatus according to the invention, comprising a cylindrical housing 1 the lower portion 2 of which has a larger diameter than the upper portion. The top of the housing 1 is provided with a flange 3 whose thickness decreases towards the circumference. An annular plate 4 is secured to the flange 3, e.g. by means of bolts 5. The diameter of the annular plate 4 is substantially equal to that of the flange 3. The thickness of the annular plate 4 also decreases towards the circumference, so that between plate 4 and flange 3 there is produced a basically V-shaped slot 6. The housing 1 with lower portion 2, flange 3 and annular plate 4 is mounted for rotation on a cylinder 7 having a cylindrical foot 8 arranged within the housing. Said foot 8 may be secured in a place where the winch according to the invention will be used, e.g. the deck of a ship. A stripper arm 9 is attached to the top of cylinder 7, which arm 9 comprises a portion which extends downwardly beyond the circumference of the annular plate 4 and the flange 3. The stripper arm 9, in operation, serves for guiding a line from the circumference of the housing 1 into the V-shaped slot 6 between flange 3 and annular plate 4. A shaft 10 in the cylinder 7 extends into the cylindrical foot 8 where a transmission mechanism 11 ensures the transmission of a rotating motion of the shaft 10 to the housing 1 with lower portion 2, flange 3 and annular plate 4. The shaft 10 is provided at the top with e.g. an internally toothed cavity wherein the likewise toothed end of a crank can be inserted so as to thereby rotate the shaft 10 and via the mechanism 11, the housing 1 with associated parts. The entire construction, as described in the above, is known per se and is described e.g. in U.S. Pat. No. 3,985,340.

Figure 2:
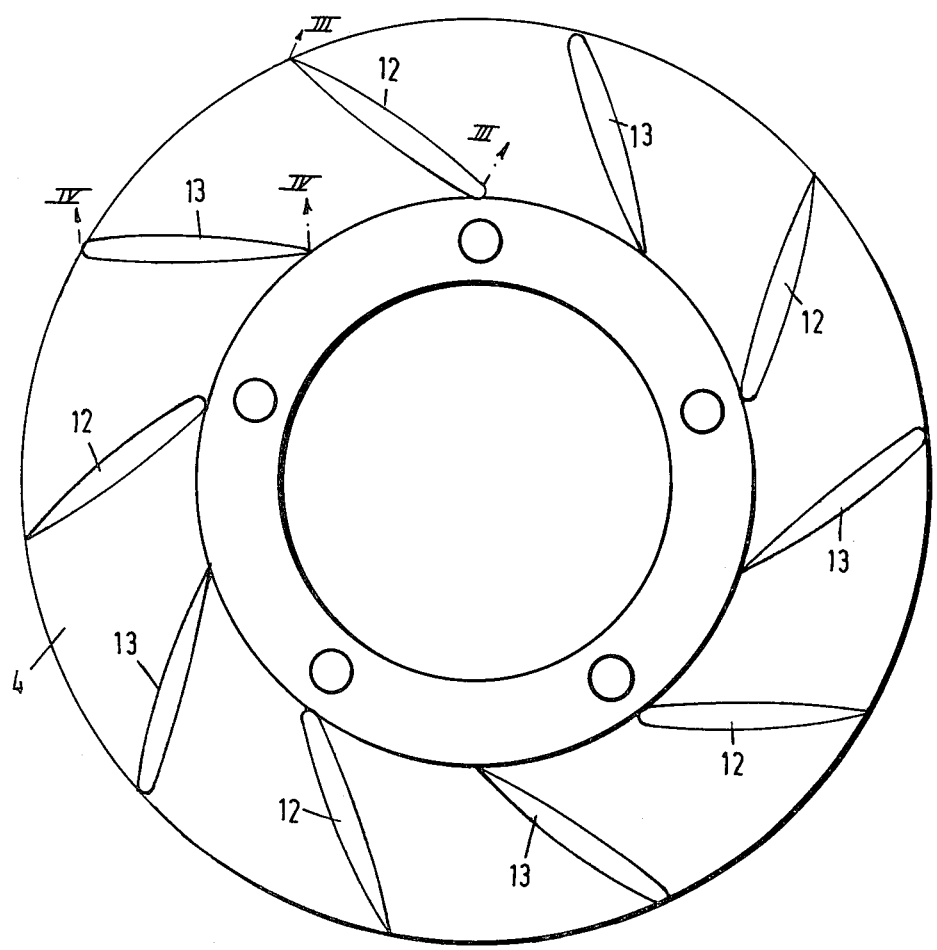
FIG. 2 is a bottom view of the annular plate mounted on the flange at the top of the housing of the winch according to FIG. 1.
Figure 3:
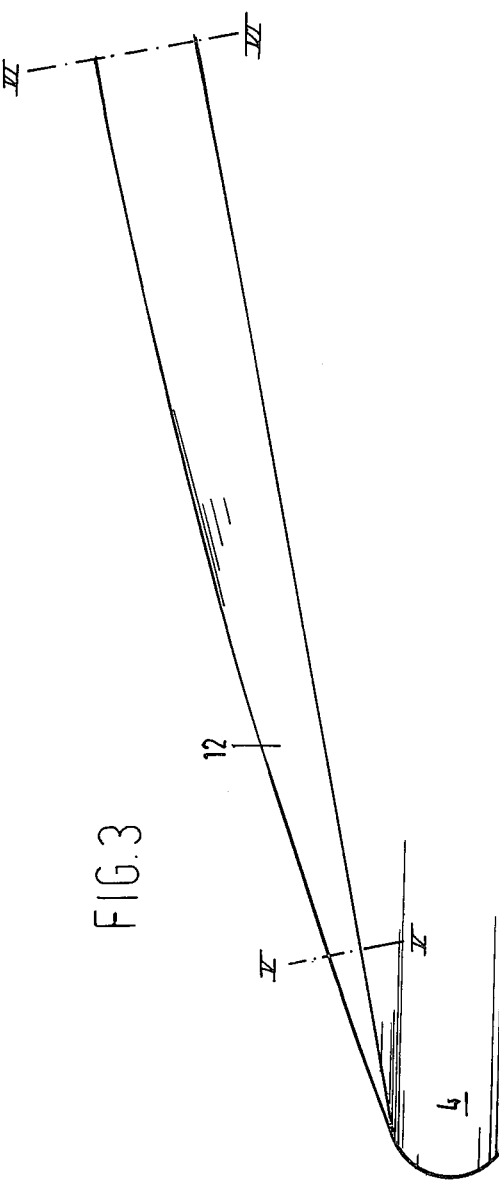
FIGS. 3 and 4 are cross-sections on the lines III—III and IV—IV, respectively of FIG. 2.
Figure 4:
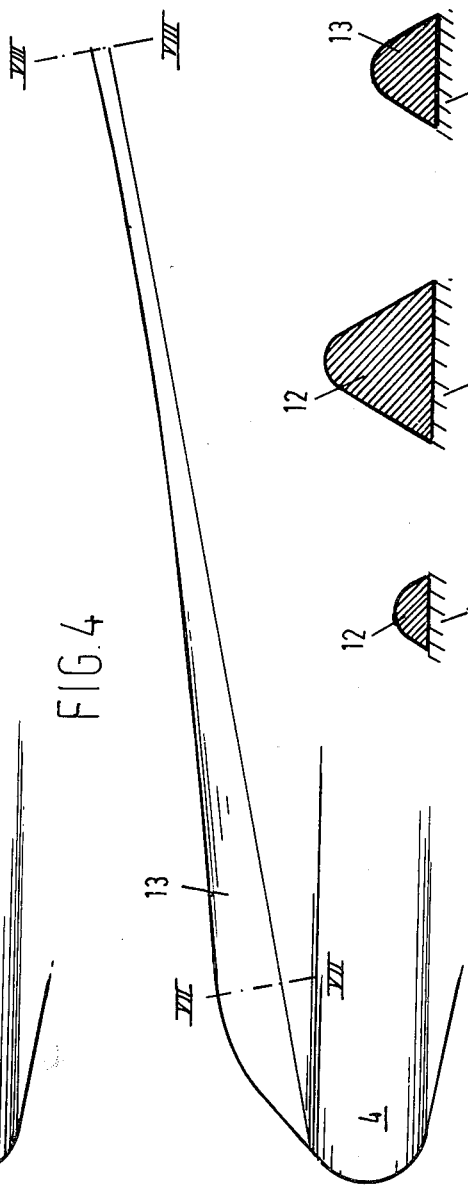
Figure 5:
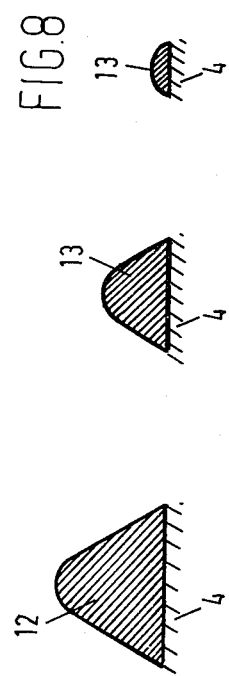
FIGS. 5, 6, 7 and 8 are cross-sections on the lines V—V and VI—VI, of FIG. 3, and the lines VII—VII and VIII—VIII, respectively of FIG. 4.
Figure 6:
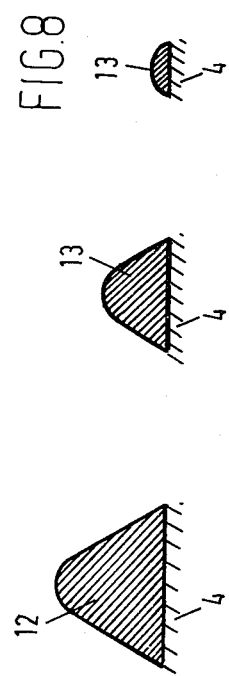
Figure 7:
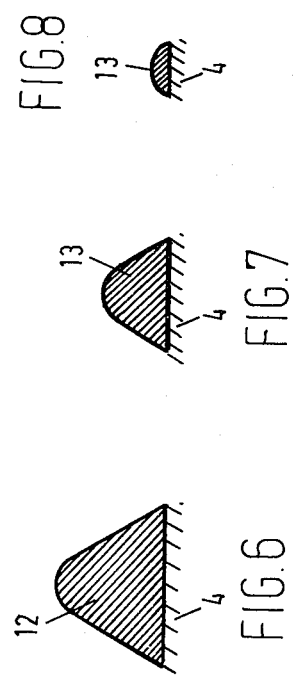
Figure 8:
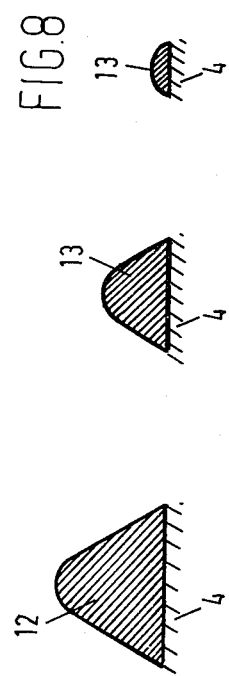

The particular feature of the winch according to the invention, as shown in FIG. 1, is the presence of very specially shaped ribs or teeth on the surface of the flange 3 at the side of the annular plate 4 and on the surface of the plate 4 at the side of the flange 3. For the sake of elucidation, a bottom view of the removed annular plate 4 is shown in FIG. 2. On the surface of the annular plate 4 there are provided the curved, spirally outwardly oriented teeth or ribs 12, 13. The teeth or ribs 12 are convex and the teeth or ribs 13 concave. In the embodiment shown, the convex teeth 12 and the concave teeth 13 are arranged alternately on the surface of the plate 4. A cross-sectional view of one of the convex teeth, taken on the line III—III of FIG. 2, is shown in FIG. 3, while a cross-sectional view of one of the concave teeth 13, taken on the line IV—IV, is shown in FIG. 4. In order to give an impression of the form of the ribs or teeth 12, 13, cross-sectional views of the tooth 12, taken on the lines V—V and VI—VI of FIG. 3, are shown in FIG. 5 and FIG. 6, and cross-sectional views of the tooth 13, taken on the lines VII—VII and VIII—VIII of FIG. 4, are shown in FIGS. 7 and 8.

Figure 9:
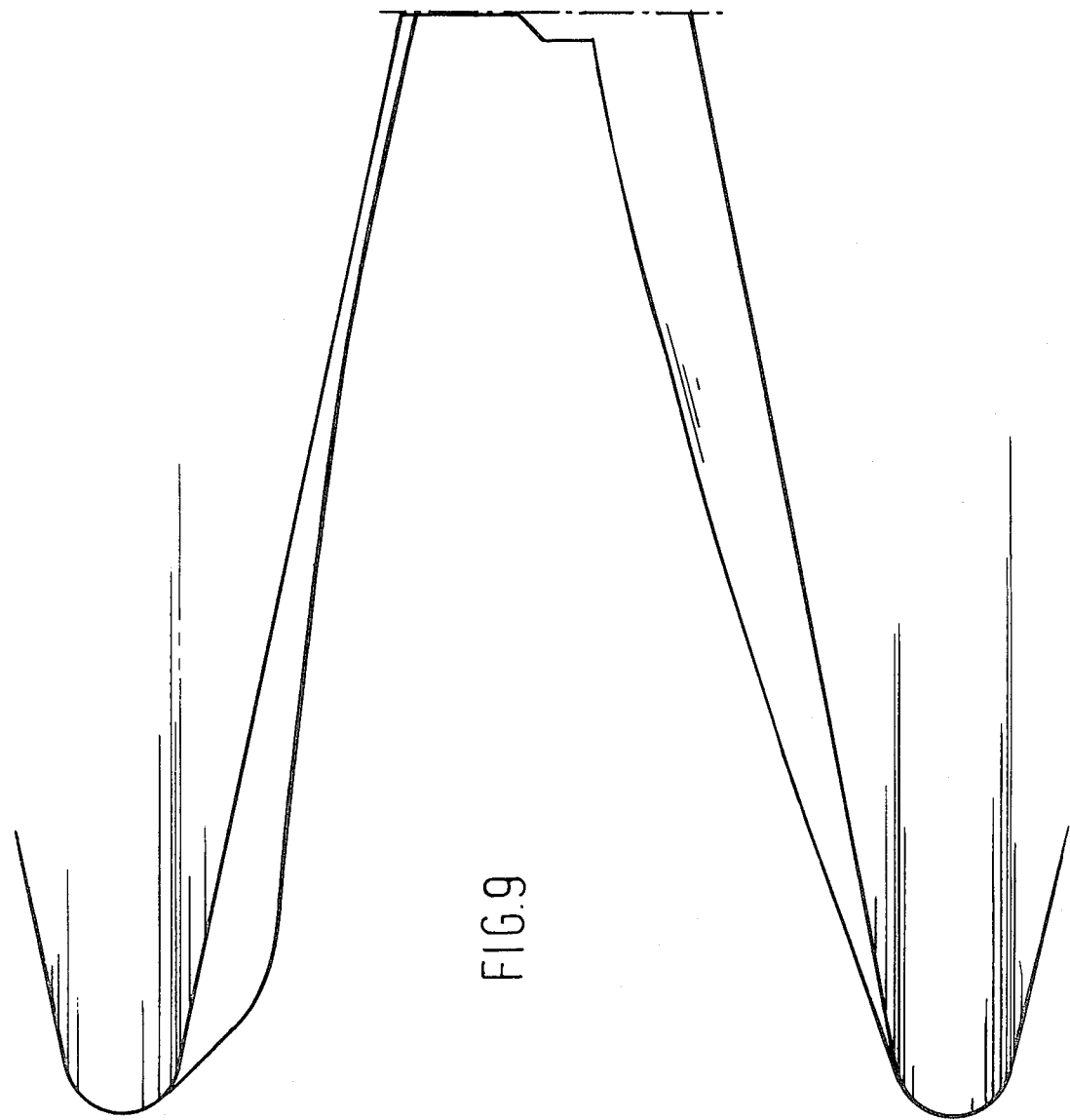
FIG. 9 is a cross sectional view of a part of the flange and annular plate of the winch according to FIG. 1 at a location where a convex tooth is opposite a concave tooth.

On the surface of the flange 3 facing the annular plate 4 there are also provided alternately convex and concave teeth or ribs in such a way that opposite each convex tooth on the plate 4, there is a concave tooth on the flange 3 and opposite a concave tooth on the plate there is a convex tooth on the flange 3. FIG. 9 is a cross-sectional view of a part of the plate 4 and the flange 3 at the location where there is provided a concave rib or tooth 13 on the plate 4 opposite a convex rib or tooth 12 on the surface of the flange 3.

The material of which the winch according to the invention is made is preferably chosen in such a manner that the winch is highly resistant to corrosion and wear. The housing and the cylinder are made e.g. of an aluminum-silicon-magnesium alloy consisting essentially of aluminum and having a copper content of less than 0.01%, with a coating obtained by anodizing. The drive shaft for the transmission mechanism is made e.g. of chromium-containing, hardened stainless steel. The same applies to the various gears and parts of said transmission mechanism, while bearings are provided with a durable synthetic plastics material.

What I claim:

1. A self-tailing winch comprising a substantially cylindrical housing arranged for rotation about a central shaft, and housing being provided at the top with a flange thinning towards the circumference and an annular plate disposed on the top of the housing and thinning towards the circumference, said plate having a diameter substantially equal to that of the flange in such a way that between the flange and the annular plate there is produced a V-shaped slot, and a stripper arm mounted above the annular plate, said stripper arm having a portion extending downwardly beyond the circumference of the annular plate, characterized in that raised teeth are provided on the facing surfaces of said annular plate and said flange, said surfaces defining the V-shaped slot, so that opposite each tooth on the flange surface there is present a tooth on the surface of the plate, one tooth of each pair of opposed teeth being convex and one tooth being concave in the direction along the length of the teeth from a point near the inside of the V-shaped groove towards a point near the circumference of the respective flange or plate.

2. A self-tailing winch according to claim 1, characterized in that the teeth on the surface of the flange are alternately convex and concave.

3. A self-tailing winch according to claim 1 or 2, wherein the teeth do not lie in the plane through the axis of the housing and the point first mentioned.

4. A self-tailing winch comprising a substantially cylindrical housing arranged for rotation about a central shaft, said housing being provided at the top with a flange thinning towards the circumference and an annular plate disposed on the top of the housing and thinning towards the circumference, said plate having a diameter substantially equal to that of the flange in such a way that between the flange and the annular plate there is produced a V-shaped slot, and a stripper arm mounted above the annular plate, said stripper arm having a portion extending downwardly beyond the circumference of the annular plate, characterized in that raised teeth are provided on the facing surfaces of said annular plate and said flange, said surfaces defining the V-shaped slot, so that opposite each tooth on the flange surface there is present a tooth on the surface of the plate, one tooth of each pair of opposed teeth being convex and one tooth being concave, and wherein the portion of each convex tooth that is highest relative to the surface of the flange or plate carrying the tooth lies adjacent the inside of the V-shaped slot, while the portion of each concave tooth that is highest relative to the surface of flange or plate lies adjacent the circumference of the respective flange or plate, with the height of the highest portion of a convex tooth being larger than the height of the highest portion of opposite concave

* * * * *

UNITED STATES PATENT AND TRADEMARK OFFICE
CERTIFICATE OF CORRECTION

PATENT NO. : 4,475,718
DATED : October 9, 1984
INVENTOR(S) : Willem P. van Beers It is certified that error appears in the above-identified patent and that said Letters Patent are hereby corrected as shown below:

Column 4, line 13, after "shaft,",

"and" should be --said--.

Signed and Sealed this

Second Day of July 1985

[SEAL]

Attest:

DONALD J. QUIGG

Attesting Officer     Acting Commissioner of Patents and Trademarks